United States Patent [19]

Stock

[11] Patent Number: 4,938,998

[45] Date of Patent: Jul. 3, 1990

[54] PROCESS FOR TREATING THE SURFACE OF A PLASTIC ARTICLE

[76] Inventor: Juergen Stock, Am Buelten 3, 3300 Braunschweig, Fed. Rep. of Germany

[21] Appl. No.: 898,307

[22] Filed: Aug. 20, 1986

[30] Foreign Application Priority Data

Aug. 24, 1985 [DE] Fed. Rep. of Germany ....... 3530366

[51] Int. Cl.$^5$ ........................ B05D 3/08; B05D 3/02; B32B 27/38
[52] U.S. Cl. .................................... 427/223; 427/386; 427/385.5; 427/384; 427/415; 427/393.5; 428/413; 428/508; 428/543; 428/516; 428/424.8; 428/355; 428/42; 428/35.7
[58] Field of Search ............... 428/543, 516, 413, 508; 427/386.2, 236, 372.2, 410, 417, 416, 208.2, 223, 415, 384, 385.5, 393.5,

[56] References Cited

U.S. PATENT DOCUMENTS

| | | | |
|---|---|---|---|
| 2,980,554 | 4/1961 | Gentile et al. | 427/416 X |
| 3,508,944 | 4/1970 | Henderson et al. | |
| 3,914,483 | 10/1975 | Stipek, Jr. | 428/42 |
| 3,925,302 | 12/1975 | Magder et al. | 428/543 |
| 4,027,068 | 5/1977 | Saad | 427/163 X |
| 4,356,236 | 10/1982 | Koshugi | 427/2 |
| 4,675,245 | 6/1987 | von Meer | 428/513 |

Primary Examiner—P. C. Ives
Attorney, Agent, or Firm—Foley & Lardner, Schwartz, Jeffery, Schwaab, Mack, Blumenthal & Evans

[57] ABSTRACT

A plastic article, especially of polypropylene or polyethylene, can be rendered resistant to diffusion of motor fuel vapors or the like and/or prepared for surface-coating by applying a film of a naturally-occurring, enzymatically-functionalized cellulose derivative having a functional phosphate, sulfate, carbonate or amino group.

12 Claims, 1 Drawing Sheet

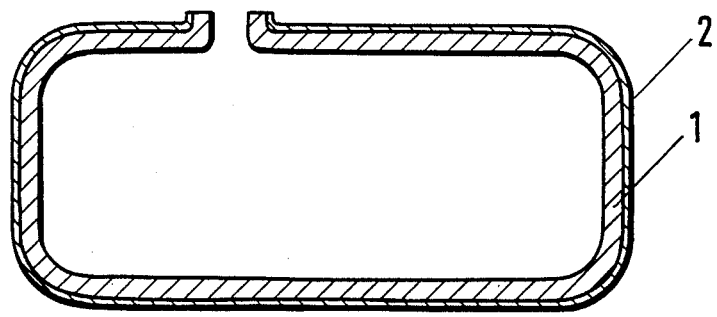

PROCESS FOR TREATING THE SURFACE OF A PLASTIC ARTICLE

BACKGROUND OF THE INVENTION

The present invention relates to a process for treating the surface of a plastic article, especially an article made of a polyolefin, in particular polypropylene or polyethylene. The invention also relates to a correspondingly treated plastic article.

In particular, the treatment of surfaces of plastic articles made from polymers of nonaromatic hydrocarbons meets with considerable difficulties. In order to enable such plastics to be lacquered or painted, priming is necessary. It is known to effect such a priming with polyester resins dissolved in xylene or ethylbenzene. These solvents incipiently dissolve the surface of the plastic component and thus permit adhesion of the polyesters via secondary valences. However, the solvents are highly toxic, so that their processing raises problems.

A different treatment of the surface of plastic components is carried out on plastic containers for motor fuel. Fuel containers of polypropylene or polyethylene are also particularly suitable, especially for unleaded gasoline types, since fuel containers of metal experience considerable disadvantages because of the corrosive nature of the unleaded fuels.

Without a surface treatment, however, the plastic containers allow an unduly high diffusion of fuel vapors. This diffusion cannot be tolerated for reasons of pollution of the environment and because of the losses of fuel. In a known technique, the inner surfaces of the fuel containers are therefore sulfonated by means of gaseous sulfur trioxide, whereby the surface of the tank is rendered hydrophilic and thus prevents diffusion of the fuel. Another process for reducing diffusion consists in fluorinating the container. However, this process has not yet been industrially proven.

Both sulfonation and fluorination of the fuel containers have the disadvantage that substances are used which are aggressive and injurious to health, and furthermore the release of these substances into the environment must be prevented under any circumstances. Apart from the health hazard, the processes are very expensive and must be carried out under extensive safety precautions.

SUMMARY OF THE INVENTION

It is therefore an object of the present invention to provide an improved process for treating the surface of plastic articles. A particular object of the invention is to provide such a surface treatment which does not involve serious toxic risks, either during manufacture or in use of the plastic article.

Another object of the present invention resides in the provision of an improved plastic article having its surface treated by means of the process according to the invention.

In accomplishing the foregoing objects, there has been provided in accordance with one aspect of the present invention a process for treating the surface of a plastic article, comprising the steps of dissolving a naturally-occurring, enzymatically-functionalized cellulose derivative having a functional phosphate, sulfate, carbonate or amino group in water to form a solution; applying the solution to a surface of the plastic article; and drying the solution to form a film on the surface. Preferably, the process further comprises the step of adding to the solution of the cellulose derivative a monomer or polymer, which is capable of reacting with the functional group of the cellulose derivative.

In accordance with another aspect of the present invention, there has been provided a plastic article which comprises a plastic article, preferably of polyethylene or polypropylene; and applied to the surface of the plastic article, a film comprised of a naturally-occurring, enzymatically-functionalized cellulose derivative having a functional phosphate, sulfate, carbonate or amino group. The article is preferably a motor fuel container, wherein the film covers substantially the entire outside surface of the container.

Further objects, features and advantages of the present invention will become apparent from the detailed description of preferred embodiments which follows, when considered together with the accompanying figure of drawing.

BRIEF DESCRIPTION OF THE DRAWING

The figure of drawing schematically illustrates a plastic container having a surface treatment according to the invention.

DETAILED DESCRIPTION OF THE PREFERRED EMBODIMENTS

The invention involves dissolving in water a naturally-occurring, enzymatically-functionalized cellulose derivative having a functional phosphate, sulfate, carbonate or amino group, applying this solution to the surface of the plastic article and forming a film thereon by drying. A plastic article coated according to the invention therefore has on its surface a film of a naturally-occurring, enzymatically-functionalized cellulose derivative having a functional phosphate, sulfate, carbonate or amino group.

A cellulose derivative of this type which can be used is preferably a deacetylated chitin, which is known under the name chitosan and contains glucosamine as the monomer unit. This compound is a poly-($\beta$-1,4-glucosamine which is a nitrogen-containing, unbranched polysaccharide. The functional group is therefore an amino group. Agar, alginate or carrageenan are examples of cellulose derivatives having the other possible functional groups mentioned above.

In order to obtain a diffusion barrier for fuels, it is sufficient to apply only one film of a cellulose derivative, preferably to the outer surface of the plastic container. For this purpose, the cellulose derivative is applied in the form of an aqueous solution to the surface. If dissolution in water does not proceed at the requisite rate, it can be assisted by heating and, if appropriate, by adjusting the pH value into the acidic region, for example, by the addition of acids such as formic acid, acetic acid or mineral acid. Depending on the selected method of application (spraying, blade-coating, casting or the like), the viscosity can be adjusted by means of a highly volatile organic solvent, preferably acetone. In this way, the otherwise required water content is reduced, and drying of the layer is facilitated.

After application of the cellulose derivative, the dried layer forms a film which is insoluble in organic solvents and insoluble to sparingly soluble in water. This provides a hydrophilic surface of the plastic container and thus prevents diffusion of the organic vapors.

To stabilize the cellulose derivative film, suitable monomers or reactive polymers can be added, which undergo a condensation reaction with integration of the cellulose derivatives. Polyepoxides, the hardening time of which can be controlled by the addition of hardeners, are particularly suitable. Other suitable additives are polymers containing carboxylic acid anhydrides, or polymers containing an acid chloride, polyurethanes, or the like. When the adhesion-promoting reactive monomers or polymers are added, the cellulose derivatives can be chemically bound into the reaction chain in the manner of a graft polymerization, graft condensation or graft addition, or they can be only occluded in the resulting film. As a result of the addition of the adhesion-promoting reactive monomers or polymers to the solution of the polysaccharide (the viscosity of which may have been adjusted by means of the solvent), a surface layer is formed which is tacky for a certain time, which is adjusted by hardeners or reaction accelerators added just before processing. This tacky surface exhibits particularly good properties as a priming layer and can be lacquered or painted or can accept adhesive labels without any problem.

The naturally-occurring, enzymatically-functionalized cellulose derivatives used for the first time according to the invention for coating of plastic articles have the essential advantage that they can be to the surface particularly easily and inexpensively. It is known to use other cellulose derivatives for coating, for example, as a painting substrate. For the preparation of these cellulose derivatives, for example, methylcellulose compounds, the water-insoluble cellulose must be functionalized in relatively complicated process steps in order to obtain the necessary solubility. These process steps are hardly feasible industrially or require very high expense, which makes their use in practice uneconomical for many applications.

EXAMPLE

A commercially available, low viscosity grade chitosan suspension (manufacturer Chugai Boyeki Co. Ltd., Tokyo, Japan) is dissolved in water by heating the suspension to about 80° C. with the addition of acetic acid, formic acid or hydrochloric acid at a concentration of 5-7 ml of concentrated acid per liter of chitosan suspension. If necessary, the viscosity is adjusted by addition of acetone, in order to enable the desired application process (spraying, blade-application, coating or the like) to be carried out. As a reactive component, an epoxide resin is then added which reacts with the amino groups of the chitosan. The pot life can be adjusted by means of a hardener which contains amino groups and which is added just before the film is applied. An epoxide/hardener combination was used which is commercially available under the description UHU-Schnellfest (manufacturer: Lingner-Fischer, Buehl, West Germany).

The drying time of the film is determined by the water content of the suspension. The addition of acetone reduces the drying time. During the drying time, which can take up to 24 hours in the case of a free surface and is thus substantially longer than the reaction time, the coating can be used for adhesive bonding. Processing of the mixture while it is still warm also reduces the length of action time and drying.

After drying, the film is insoluble in water, motor fuels and organic solvents.

If necessary, the adhesion of the film can be improved by a preceding flame treatment of the plastic surface of polyethylene or polypropylene. This leads to a partial oxidation of the surface, without changing the properties of the plastic.

With a layer applied in this way, it was possible to reduce the diffusion rate down to a quarter to one-fifth of that of the untreated plastic tank. This reduction also proved to be stable over a prolonged storage period.

The drawing shows a fuel container which consists of a plastic wall 1 which is coated on the outside with a polysaccharide film 2 for the purpose of reducing diffusion. For illustrative purposes, the wall 1 and the film 2 have been shown with an exaggerated thickness.

What is claimed is:

1. A process for treating the surface of a plastic article, comprising the steps of:
   dissolving a naturally-occurring, enzymatically-functionalized cellulose derivative having a functional phosphate, sulfate, carbonate or amino group in water to form a solution;
   adding to the solution of the cellulose derivative a monomer or polymer, which is capable of reacting with the functional group of the cellulose derivative and which is further capable of forming a matrix embedding the cellulose derivative;
   applying the solution to a surface of the plastic article; and
   drying the solution to form a film on said surface.

2. A process as claimed in claim 1, wherein said dissolution step includes adding an acid to the water in order to assist the dissolution of the cellulose derivative in water.

3. A process as claimed in claim 1, further comprising the step of adding a highly volatile organic solvent for adjusting the viscosity of the solution.

4. A process as claimed in claim 1, wherein a polyepoxide is added to the solution of the cellulose derivative.

5. A process as claimed in claim 4, further comprising the step of adding a hardener or reaction accelerator to control the reaction time of the polyepoxide.

6. A process as claimed in claim 1, wherein the cellulose derivative comprises chitosan.

7. A process as claimed in claim 1, wherein said plastic comprises a polyolefin selected from polyethylene and polypropylene.

8. A process as claimed in claim 7, further comprising the step of partially oxidizing the surface of said plastic article prior to said applying step.

9. A process as claimed in claim 8, wherein said step of partially oxidizing comprises applying a flame treatment to the surface of said plastic article.

10. A process as claimed in claim 1, further comprising, the step of applying a lacquer or paint layer over said dried film while the film is still in a tacky state.

11. A process as claimed in claim 1, further comprising, the step of applying an adhesive label over said film while the film is still in a tacky state.

12. A plastic article produced by the process defined by claim 1.

* * * * *